United States Patent
Brychell

(10) Patent No.: US 10,927,591 B1
(45) Date of Patent: Feb. 23, 2021

(54) EXTRUDED DOOR FRAME WITH CONNECTING MOLDING AND COMPARTMENT FOR ELONGATED LIGHT EMITTING ELEMENT

(71) Applicant: Joseph Brychell, North Wales, PA (US)

(72) Inventor: Joseph Brychell, North Wales, PA (US)

( * ) Notice: Subject to any disclaimer, the term of this patent is extended or adjusted under 35 U.S.C. 154(b) by 16 days.

(21) Appl. No.: 16/669,422

(22) Filed: Oct. 30, 2019

(51) Int. Cl.
  *E06B 1/52* (2006.01)
  *F21V 33/00* (2006.01)
  *E06B 1/12* (2006.01)
  *E06B 7/28* (2006.01)

(52) U.S. Cl.
  CPC ............... *E06B 1/528* (2013.01); *E06B 1/12* (2013.01); *E06B 7/28* (2013.01); *F21V 33/006* (2013.01)

(58) Field of Classification Search
  CPC . E06B 1/12; E06B 1/366; E06B 1/522; E06B 1/528; E06B 7/28; F21V 33/006
  See application file for complete search history.

(56) References Cited

U.S. PATENT DOCUMENTS

| | | | | |
|---|---|---|---|---|
| 500,026 | A | * | 6/1893 | Morey ..................... E05B 17/10 362/100 |
| 1,191,783 | A | * | 7/1916 | Harsh ..................... E05B 17/10 362/100 |
| 2,777,943 | A | * | 1/1957 | Moeller ................... E05B 17/10 362/257 |
| 4,649,376 | A | * | 3/1987 | Frank ...................... G08B 7/062 174/101 |
| 5,499,171 | A | * | 3/1996 | Simpson ................. E05B 17/10 362/100 |
| 5,803,581 | A | * | 9/1998 | Brockmann ............ E05B 17/10 362/100 |
| 5,961,072 | A | * | 10/1999 | Bodle ....................... B60Q 3/46 244/118.5 |
| 6,023,224 | A | * | 2/2000 | Meyvis ................... E05B 47/00 340/545.1 |
| 6,058,635 | A | * | 5/2000 | Morris ..................... G09F 13/04 40/544 |
| 6,632,100 | B1 | * | 10/2003 | Richardson ............ H01R 33/08 439/230 |
| 6,638,088 | B1 | * | 10/2003 | Richardson ........... F21V 19/008 439/242 |
| 7,125,136 | B1 | * | 10/2006 | Dedic ........................ E06B 1/52 362/152 |
| 7,339,488 | B2 | * | 3/2008 | Pennington .............. G08B 5/36 340/628 |
| 8,029,174 | B2 | | 10/2011 | Murray |
| 9,163,428 | B1 | * | 10/2015 | Fare ........................ E05B 17/10 |
| 9,265,115 | B1 | * | 2/2016 | Dunn ...................... G08B 7/062 |
| 10,359,178 | B2 | * | 7/2019 | Huse ..................... E04F 11/1808 |

(Continued)

*Primary Examiner* — James M Ference
(74) *Attorney, Agent, or Firm* — Mark Young, PA

(57) ABSTRACT

A door frame is comprised of extruded door frame elements, each coupled with an extruded molding, and each including a compartment for containing an elongated light emitting element that is coterminous with the extruded door frame element and emits light evenly along its length and away from a wall. The compartment includes a back wall and an outer side wall with a flanged end. One or more light sources supply light to the lighting element. A controller and a sensor activate the light source upon detection of a stimulus.

20 Claims, 8 Drawing Sheets

(56) References Cited

U.S. PATENT DOCUMENTS

| | | | | |
|---|---|---|---|---|
| 2004/0016186 | A1* | 1/2004 | Iarussi | E06B 7/28 |
| | | | | 52/173.1 |
| 2007/0263413 | A1* | 11/2007 | Spira | F21S 4/20 |
| | | | | 362/633 |
| 2008/0013303 | A1* | 1/2008 | Guarino | F21V 33/006 |
| | | | | 362/145 |
| 2008/0285264 | A1* | 11/2008 | Whitehouse | F21V 19/0045 |
| | | | | 362/217.05 |
| 2009/0039791 | A1* | 2/2009 | Jones | H05B 47/28 |
| | | | | 315/118 |
| 2009/0211183 | A1* | 8/2009 | Kerscher | E06B 1/522 |
| | | | | 52/204.1 |
| 2009/0211184 | A1* | 8/2009 | Kerscher | E06B 1/347 |
| | | | | 52/204.1 |
| 2010/0277898 | A1* | 11/2010 | Murray | F21S 4/20 |
| | | | | 362/146 |
| 2010/0315020 | A1* | 12/2010 | Codoni | F21V 33/0016 |
| | | | | 315/294 |
| 2013/0235564 | A1* | 9/2013 | Barcelos | E04F 19/0477 |
| | | | | 362/151 |
| 2014/0334136 | A1* | 11/2014 | Green | F21V 33/006 |
| | | | | 362/147 |

\* cited by examiner

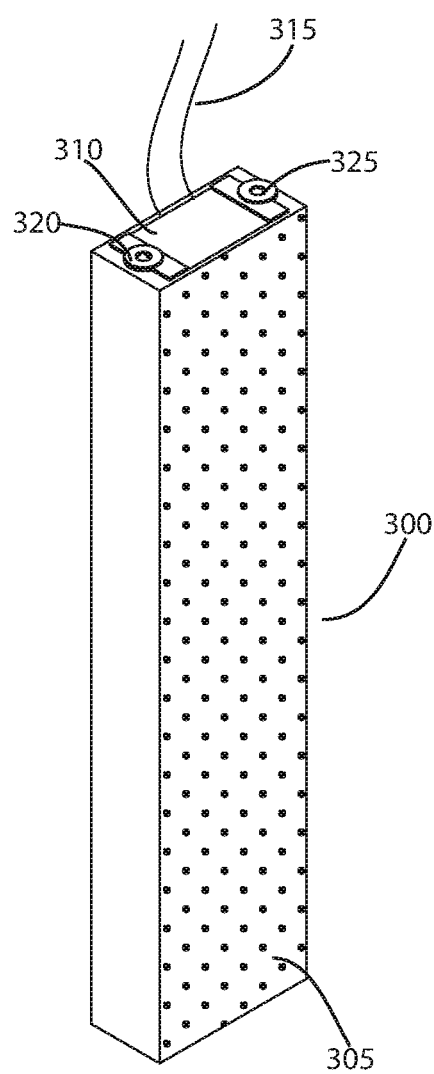
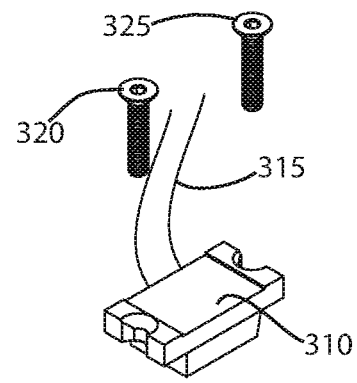
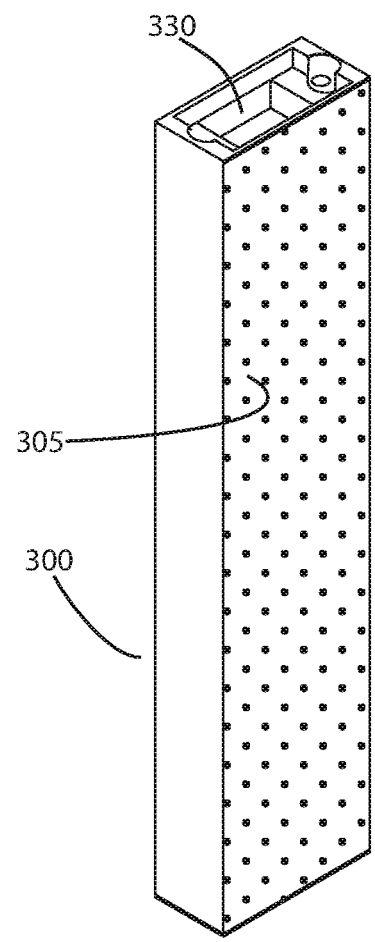
FIG. 7
FIG. 8

EXTRUDED DOOR FRAME WITH CONNECTING MOLDING AND COMPARTMENT FOR ELONGATED LIGHT EMITTING ELEMENT

FIELD OF THE INVENTION

This invention relates generally to door frames, and, more particularly, to an extruded snap frame with an integral compartment containing an elongated lighting element.

BACKGROUND

In modern construction, particularly commercial construction, doorways are framed with an extruded frame and snap on molding. The extruded frame includes a cylindrical element, a spring socket and a channel. The molding is an extruded element with a decorative profile, a concave side, a socket that is positioned and sized to receive the cylindrical element of the frame, and an elbow opposite the spring socket. A leaf spring extends from the spring socket to a V-shaped socket. The spring maintains the molding in an installed position relative to the frame. The molding may be removed by prying the end of the molding with the elbow away from the frame. Heretofore, extruded frames lack any lighting element and structure for containing a lighting element along the continuum of the periphery of the door frame, including the header.

Lighting around a door frame may serve many purposes. Door frame lights may provide illumination of a doorway for visibility during darkened conditions. Door frame lighting may serve as a notification. To the extent the color of the lighting may be controlled, a color may serve as a particular notification. Lighting may be provided on the interior side and/or exterior side of the door frame.

Past attempts to illuminate a doorway include US Patent Application Publication 2008/0013303, which describes discrete lighting assemblies embedded separately and spaced apart in jambs and a header of a door. Each lighting assembly includes a lamp housing that contains a light emitting element and a mounting bracket with spaced apart flanges. Light is directed primarily in the plane of the door. Thus, when a door is opened for entry or exit, the doorway is illuminated.

Another past attempt is U.S. Pat. No. 8,029,174, which describes an extruded threshold for an RV. The threshold includes an interior lighting compartment and an exterior lighting compartment. Each compartment contains a strip of LED lights with discrete spaced apart separate LED lights. A transparent lens covers each compartment. Such a device illuminates only the threshold, and only with discrete lighting elements.

An improved extruded door frame is needed. The frame should maintain its functionality in coupling with a compatible extruded molding. The frame should also include a compartment in which a lighting element is received. Preferably, the lighting element projects light perpendicular to the plane of the door. Preferably, the lighting element provides a continuum of light along the frame and header of the door.

The invention is directed to overcoming one or more of the problems and solving one or more of the needs as set forth above.

SUMMARY OF THE INVENTION

To solve one or more of the problems set forth above, in an exemplary implementation of the invention, a door frame is provided. The door frame is comprised of extruded door frame elements, each coupled with an extruded molding, and each including a compartment for containing an elongated light emitting element that is coterminous with the extruded door frame element. The lighting element emits light evenly along its length and away from a wall in which a doorway is formed. The compartment includes a back wall and an outer side wall with a flanged end. The lighting element is contained in the compartment between a side of the molding and the outer side wall and flanged end. The lighting element may be an edge-lit lighting element configured to emit light from the outward facing surface of the lighting the element along the entire lighting element. The lighting element is coterminous with the frame element (e.g., extending from a top to a bottom, but only within the compartment). One or more light sources supply light to the lighting element.

One or more switches may activate a light source. Opening or closing a door may automatically actuate a switch. A mat with a pressure pad may serve as a switch. Manually actuated switches may also control the light sources.

A logical controller may activate the light under determined conditions. The controller may receive sensor input. A sensor may detect motion, sound, ambient lighting. The logical controller may receive data or signals from external equipment.

Light sources may include one or more light emitting elements, such as light emitting diodes. The light sources may be monochrome or multicolor. A specific color may serve a specific function.

The lighting element may emit light on either or both sides of a door. Thus, for example, a lighting element may emit light into the interior of the room for the benefit of an occupant. Alternatively, a lighting element may emit light into the exterior for the benefit of a person entering, or to signify a condition to persons outside a room. The condition may be that movement is detected in the room, or that the room is occupied, or that assistance is needed in the room.

BRIEF DESCRIPTION OF THE DRAWINGS

The foregoing and other aspects, objects, features and advantages of the invention will become better understood with reference to the following description, appended claims, and accompanying drawings, where:

FIG. 7 conceptually illustrates an exemplary lighting element and light source according to principles of the invention; and FIG. 8 provides an exploded view that conceptually illustrates an exemplary lighting element and light source according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An extruded door frame according to principles of the invention includes features for coupling with a compatible extruded molding, and a compartment for containing an elongated light emitting element that is coterminous with the extruded door frame. The compartment includes a back wall and an outer side wall with a flanged end. The lighting element is contained in the compartment between a side of the molding and the outer side wall and flanged end. The lighting element may be an edge-lit lighting element configured to emit light from the outward facing surface of the lighting the element along the entire lighting element. The lighting element is coterminous with the frame. One or more light sources supply light to the lighting element.

Figure 1:
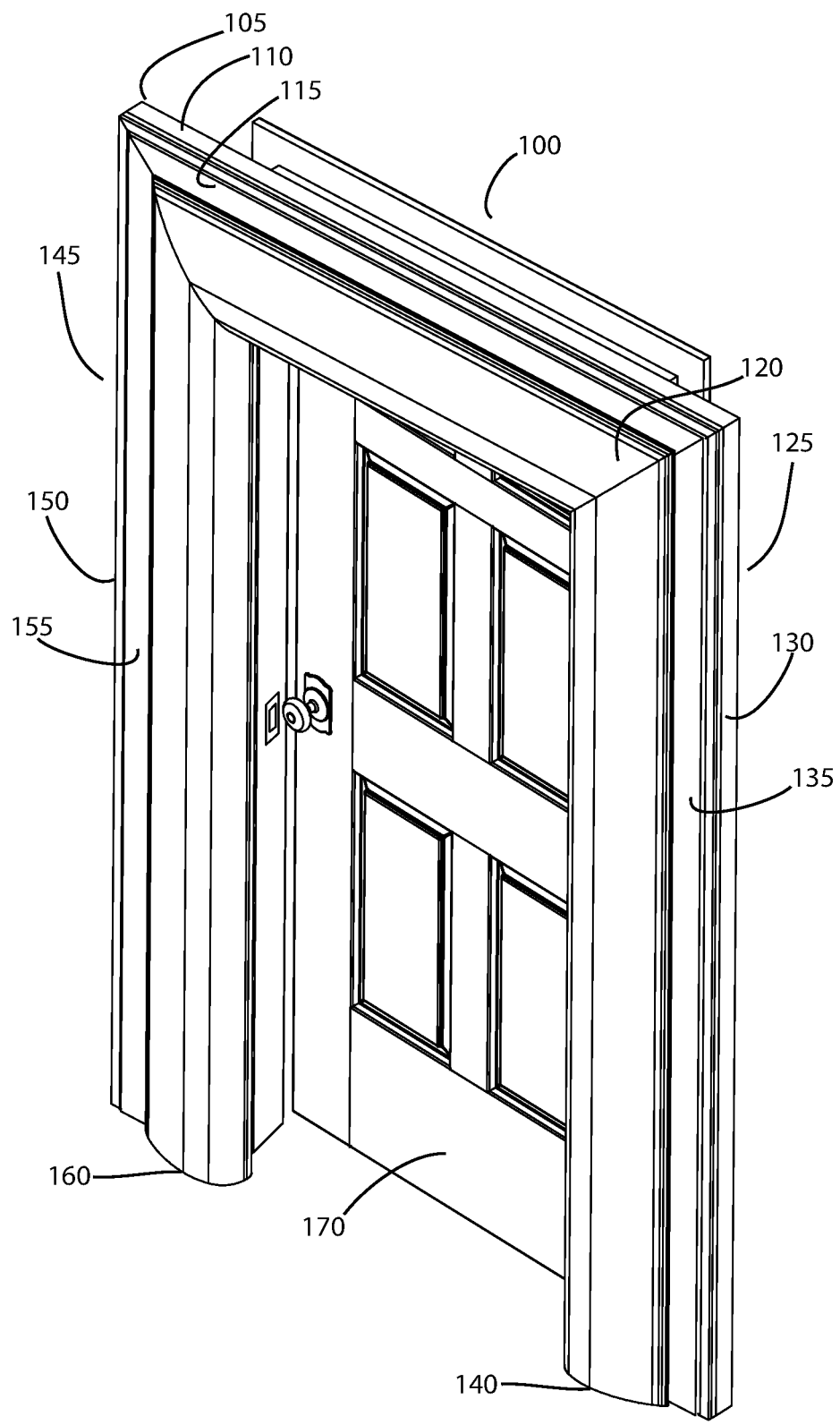
FIG. 1 conceptually illustrates an exemplary door with exemplary molding and an exemplary frame with a coterminous lighting element contained in a compartment of the frame, according to principles of the invention.

Referring to FIG. 1, an exemplary door 170 with an exemplary frame assembly 100 is conceptually illustrated. The frame assembly 100 extends along the sides and top of the doorway. Side assemblies 125, 145 extend from the floor to the top of the doorway. The top assembly 105 extends along the header of the doorway from one side assembly 125 to the other side assembly 145. Each assembly 105, 125, 145 includes an attached molding 120, 140, 160. Each assembly includes a frame 110, 130, 150. Each assembly includes an elongated light emitting element (light element) 115, 135, 155 that is coterminous with the frame 110, 130, 150. Such a frame assembly may be applied to interior and exterior doors and on the interior or exterior side of a door or on both sides of a door.

Figure 2:
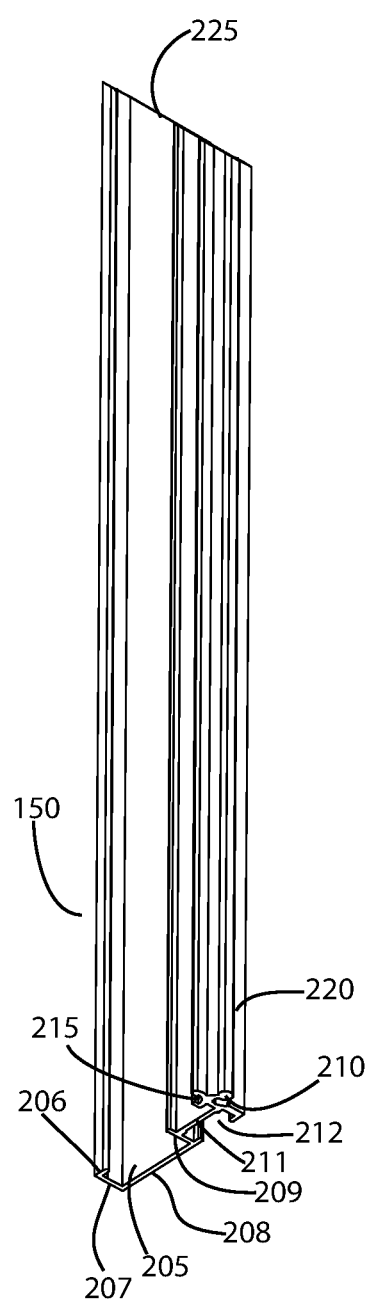
FIG. 2 provides a perspective view of an exemplary frame segment with a compartment for containing a lighting element, according to principles of the invention.
Figure 3:
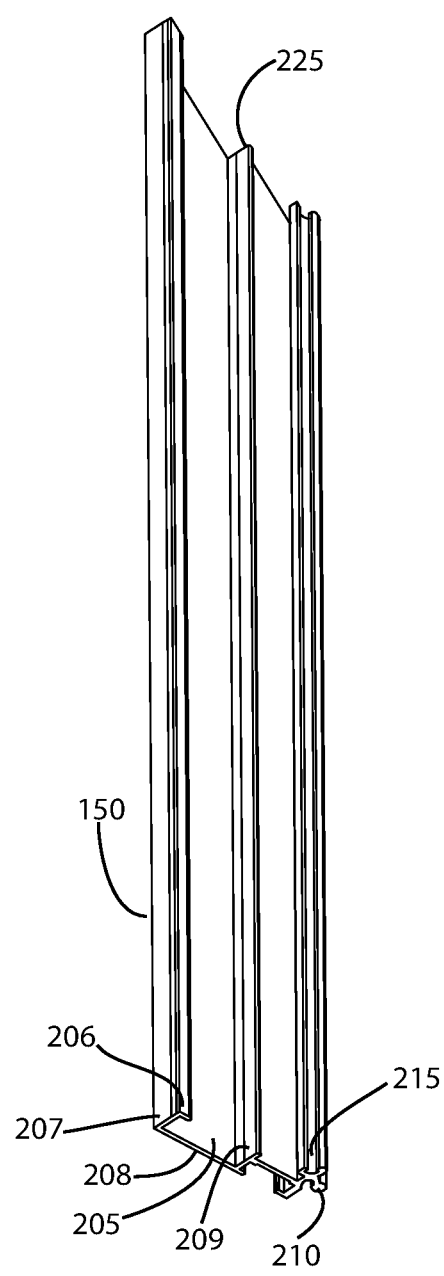
FIG. 3 provides another perspective view of an exemplary frame segment with a compartment for containing a lighting element, according to principles of the invention.

FIGS. 2 and 3 provide perspective views of an exemplary frame 150 with a first compartment 205 for containing a lighting element, according to principles of the invention. A first lateral (outer) wall 207, with a flange 206, back wall 208 and medial wall 209 define the first compartment 205. A cylindrical protrusion 210 projects from a second lateral wall 220 opposite first lateral wall 207. The cylindrical protrusion 210 provides a structure that mates with a socket of a molding (as discussed below). A claw-shaped spring socket 215 extends from the second lateral wall 220 opposite the cylindrical protrusion 210. The second lateral wall 220, medial wall 209 and connecting wall 211, which extends from the medial wall 209 to the second lateral wall 220, define a second compartment 212. An end 225 of the frame is cut at a 45-degree angle to form a miter joint with an abutting frame segment.

Figure 4:
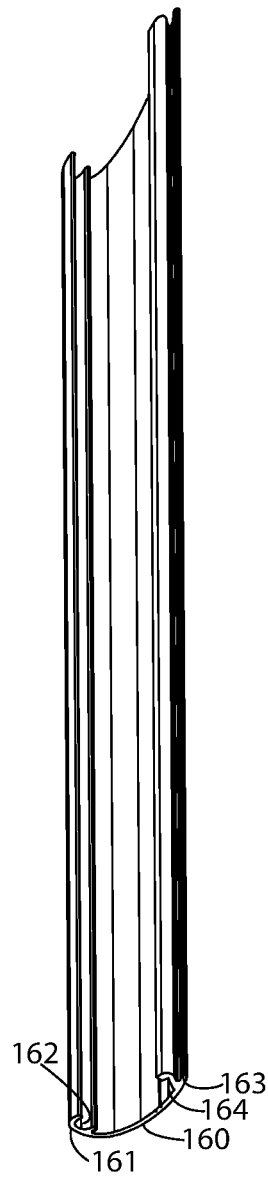
FIG. 4 provides a perspective view of an exemplary molding, according to principles of the invention.
Figure 5:
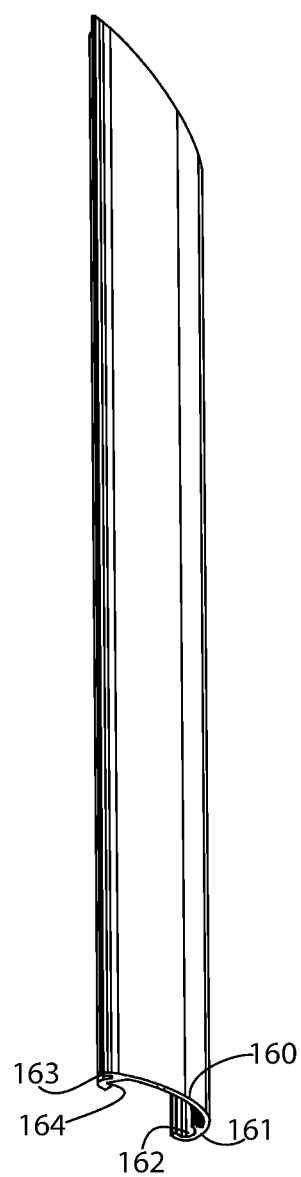
FIG. 5 provides another perspective view of an exemplary molding, according to principles of the invention.

FIGS. 4 and 5 provide a perspective view of an exemplary extruded molding 160, according to principles of the invention. The exemplary molding 160 generally features a shape of an airfoil with the bottom removed. The exemplary molding 160 includes a curved leading edge 161, a trailing edge 163, and, within a concave cavity defined by the molding 160, a C-shaped socket 162 near the leading edge 161 and a V-shaped socket 164 adjacent to the trailing edge 163. The C-shaped socket 162 receives the cylindrical protrusion 210 of the frame 150. While the exemplary molding 160 features a certain shape, the principles of the invention are not limited to a particular molding shape. Any molding shape that can be extruded and defines a compartment that contains similarly positioned C-shaped socket 162 and V-shaped socket 164 may be used without departing from the scope of the invention.

The V-shaped socket 164 serves a few purposes. It provides an elbow that may abut the lighting element 300, depending upon the configuration of the lighting element 300. It also defines a gap between the V-shaped notch 164 and the trailing edge 163, into which a tip of a tool may be inserted to pry open the molding 160. It also receives an edge of a spring 159 that retains the molding 160 on the frame 150.

Figure 6:
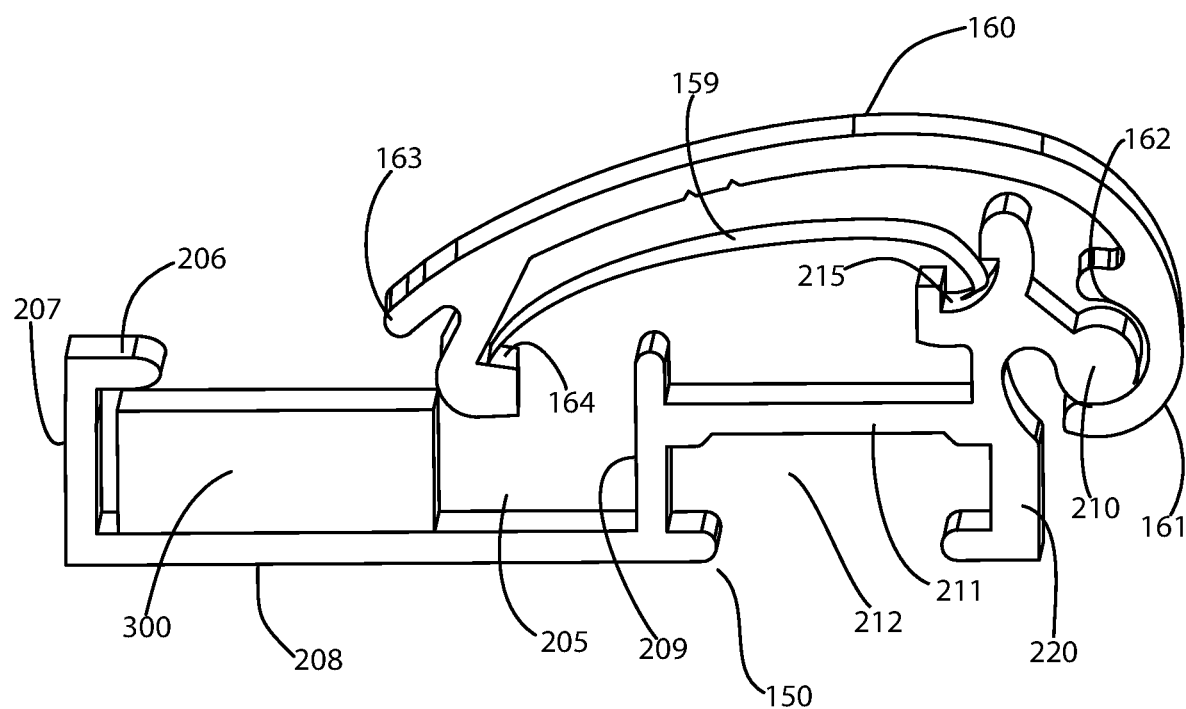
FIG. 6 provides a section view of an exemplary molding and frame with a compartment containing a lighting element, according to principles of the invention.

FIG. 6 provides a section view of an exemplary molding 160 and frame 150 with a first compartment 205 containing a lighting element 300, according to principles of the invention. The lighting element 300 is contained in the first compartment 205 between the trailing edge 163 of the molding 160 and the first lateral (outer) wall 207 of the frame 150, and between the flange 206 and the back wall 208. Alternatively, the lighting element 300 may extend from the first lateral (outer) wall 207 to the medial wall 209 of the frame 150, beneath the trailing edge 163 and V-shaped socket 164 of the molding 160, between the trailing edge 163 and V-shaped socket 164 of the molding 160 and the back wall 208 of the frame 150. The height of the lateral wall 207 (i.e., the distance from the back wall 208 to the flange 206) may be reduced or increased to accommodate a particular size and shape lighting element 300.

Optionally, the lighting element 300 may be attached to a wall of the first compartment 205. For example, the lighting element 300 may be bonded or secured with double sided tape to the back wall 208.

The molding 160 is releasably secured to the frame with a spring clip (e.g., a leaf spring) 159 that extends from claw-shaped spring socket 215 to the V-shaped socket 164. The molding 160 may pivot about the cylindrical protrusion 210. The molding may pivot from a closed position as shown in FIG. 6 to an opened position in which the socket 162 continues to engage the cylindrical protrusion 210 and the trailing edge 163 moves (clockwise in FIG. 6) along a circular arc centered at the cylindrical protrusion 210. In the opened position, the spring clip 159 is exposed for insertion or removal.

The medial wall 209 and second lateral wall 220 provide structural support for the frame 150 and spacing from a wall to which the frame 150 is attached. The spacing facilitates pivoting rotation of the molding 160 about the cylindrical protrusion 210 without interference with the wall. In the exemplary embodiment illustrated in FIG. 6, the spacing also accommodates the lighting element 300. The second lateral wall 220, medial wall 209 and connecting wall 211, which extends from the medial wall 209 to the second lateral wall 220, define a second compartment 212.

FIGS. 7 and 8 conceptually illustrate an exemplary lighting element 300 and light source 310 according to principles of the invention. The exemplary lighting element 300 is an edge lit lighting element comprised of a solid elongated cubic structure of an optical transmission medium (e.g., acrylic). In the exemplary embodiment, a compartment 330 is machined in an edge. The compartment receives a light source 310. However, such a compartment is optional. Without a compartment, a light source may be mounted flush to a side.

The light source 310 is held in place with fasteners, such as screws 320, 325. However, other fasteners including tapes and adhesives, welding (e.g., ultrasonic welding), and mechanical fasteners (e.g., clamps and snap-fit couplings) may be used within the scope of the invention.

Conductive leads (e.g., wires) 315 electronically couple the light source 310 to a driver. While two leads are shown, several leads may be utilized within the scope of the invention. The invention is not limited to a light source with two leads or any other number of leads.

The lighting element 300 includes one light emitting side 305. All sides, other than side 305 and the side to which the light source 310 is attached may be coated with a coating or sheet (e.g., a reflective coating or sheet) that prevents light emission from the side. The light source 310 transmits light into the lighting element 300. An extractor pattern formed on the light emitting surface 305 includes extractor pixels. The extractor pixels allow light transmitted in the element 300 to emit from the side 305. The extractor pixels per unit area (extractor pixel density) may vary with distance from the light source 310 to achieve a substantially spatially uniform intensity of light emitted from side 305. Unlit edge may be coated with a reflective coating. The light source 310 may be a fluorescent lamp, incandescent lamp, or light emitting diode (LED). An LED is preferred. Optionally, an image may be applied over the extractor pattern. Additionally, several layers of panels may be stacked to achieve a 3D effect.

Each extractor pixel includes an area of surface roughness, such as a recess or protrusion, or an ink coated area on a surface. A UV-curable ink applied by a flatbed printer is preferred. The ink coated area may include a grayscale image, preferably a dithered grayscale image, using a dithering algorithm such as Floyd-Steinberg, Jarvis, Judice, Ninke, Stucki, or Burkes dithering.

While a single light source 310 is illustrated, the invention is not limited to a single light source. Several light sources may be attached to a lighting element. Light sources may be attached to opposite sides of the lighting element. A plurality of light sources may be attached to an elongated side of the lighting element.

The light source 310 may be monochrome, multicolor or a package of a plurality of lamps (e.g., LEDs) of the same or different colors. If the light source 310 is configured to emit light of one of several determined colors through the lighting element 300, then the color of light emitted from the lighting element 300 may indicate a particular condition. By way of example and not limitation, white light may indicate a first condition, red light may indicate a second condition and blue light may indicate a third conditions. The conditions may be sensed or determined using sensors, switches or inputs from equipment.

Figure 9:
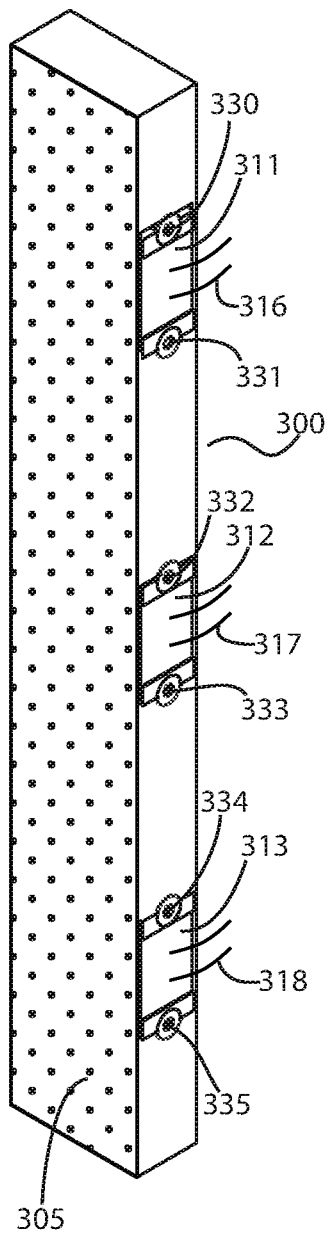
FIG. 9 conceptually illustrates an exemplary lighting element and light source according to principles of the invention.
Figure 10:
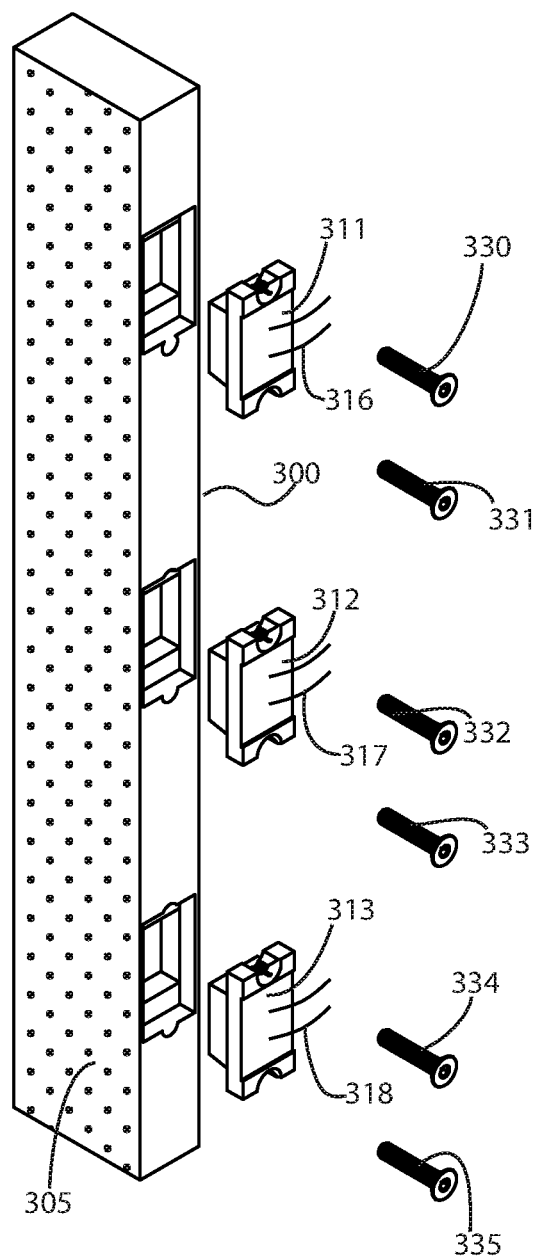
FIG. 10 provides an exploded view that conceptually illustrates an exemplary lighting element and light source according to principles of the invention.

FIGS. 9 and 10 conceptually illustrate an alternative exemplary lighting element 300 and light sources 311-313 according to principles of the invention. In this embodiment, a plurality of lighting elements (e.g., 3) are shown attached along an elongated side of the lighting element. Such a configuration facilitates light transmission along the length of a long lighting element 300, such as a lighting element sized to end the entire height of a door frame.

The light sources 311-313 are held in place with fasteners, such as screws 330-335. However, other fasteners including tapes and adhesives, welding (e.g., ultrasonic welding), and mechanical fasteners (e.g., clamps and snap-fit couplings) may be used within the scope of the invention.

Conductive leads (e.g., wires) 316-317 electronically couple the light sources 311-313 to a driver. While two leads are shown per light source, several leads may be utilized within the scope of the invention. The invention is not limited to a light source with two leads or any other number of leads.

The lighting element 300 includes one light emitting side 305. All sides and portions of sides, other than side 305 and the portion of the side to which the light sources are attached may be coated with a coating or sheet (e.g., a reflective coating or sheet) that prevents light emission from the side. The light source 310 transmits light into the lighting element 300. An extractor pattern formed on the light emitting surface 305 includes extractor pixels. The extractor pixels allow light transmitted in the element 300 to emit from the side 305. The extractor pixels per unit area (extractor pixel density) may vary with distance from the light source 311-313 to achieve a substantially spatially uniform intensity of light emitted from side 305.

The light sources 311-313 may be monochrome, multicolor or a package of a plurality of lamps (e.g., LEDs) of the same or different colors. If the light sources 311-313 are configured to emit light of one of several determined colors through the lighting element 300, then the color of light emitted from the lighting element 300 may indicate a particular condition. By way of example and not limitation, white light may indicate a first condition, red light may indicate a second condition and blue light may indicate a third conditions. The conditions may be sensed or determined using sensors, switches or inputs from equipment.

Figure 11:
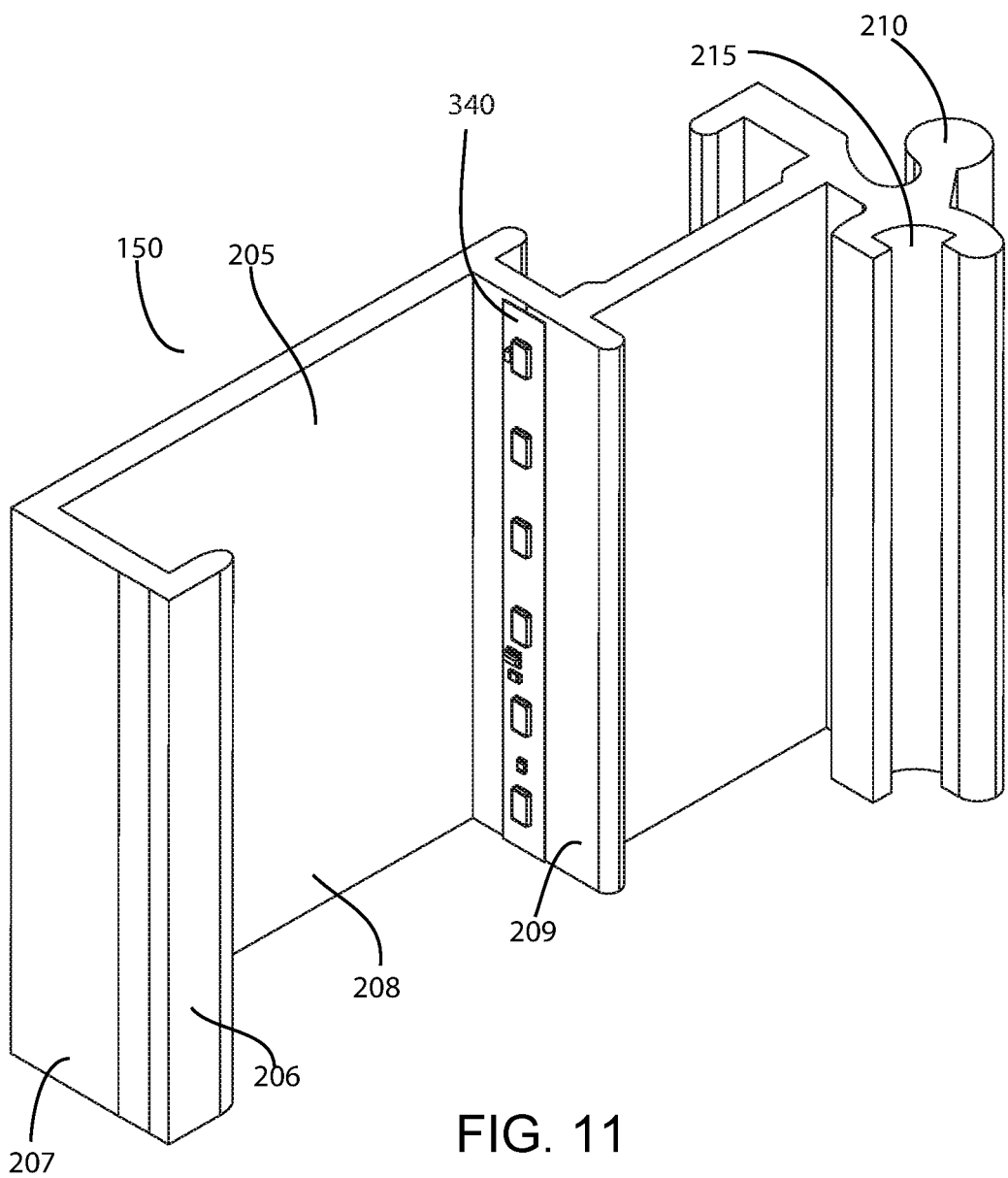
FIG. 11 conceptually illustrates an exemplary frame with an LED strip light attached to the side of the medial wall facing the lateral wall according to principles of the invention.

FIG. 11 illustrates an embodiment with an LED strip light 340 attached to the side of the medial wall 290 facing the lateral wall 207. The LED strip light (also known as an LED tape or ribbon light) is a flexible circuit board populated by surface mounted light-emitting diodes and other components, and an adhesive backing. The LED strip light may be populated with many different types of surface mounted light-emitting diodes, not only in different colors and addressable or non-addressable, by different shapes, sizes, and power levels. In this embodiment, the LED strip light 340 emits light into a nonreflective (input) side of a lighting element 300. The input side of the lighting element may be solid without compartments machined into the side. The surface mounted light-emitting diodes abut (or are immediately adjacent to) the input side of the lighting element 300 in the compartment 205 of the frame 150.

Figure 12:
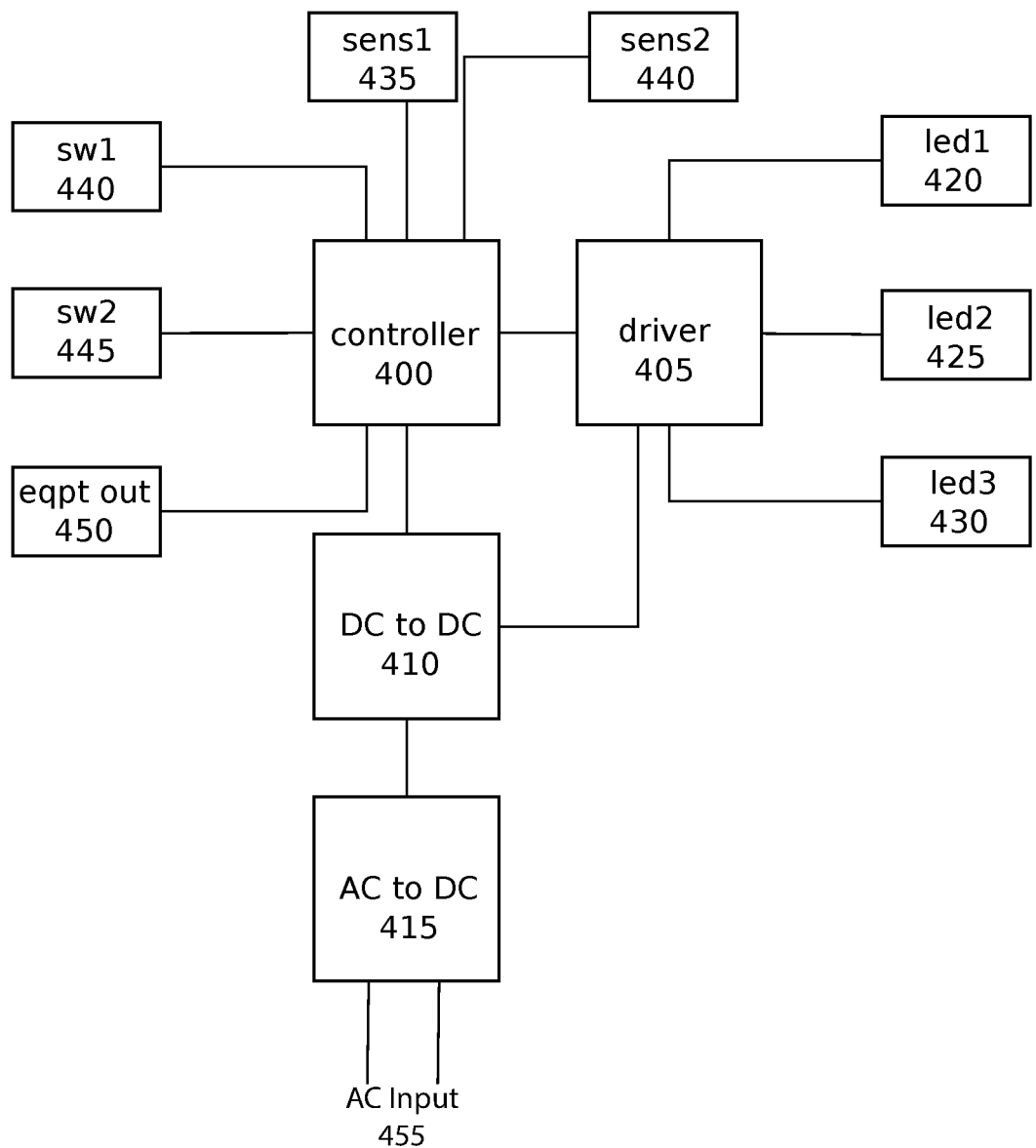
FIG. 12 is a high-level block diagram of components of an exemplary door frame lighting system according to principles of the invention.

FIG. 12 is a high-level block diagram of components of an exemplary door frame lighting system according to principles of the invention. In the exemplary embodiment, three LED light sources (LED1 420, LED2 425, LED3 430) are controlled by a driver 405. The driver 405 is an electrical circuit used to power the light sources 420, 425, 430. In the case of LED light sources, the driver provides sufficient current (either DC or AC) to light the LED 420, 425, 430 at the required brightness, while limiting the current to prevent damaging the LED. A simple drive circuit is a series resistor. Alternatively, a depletion-mode MOSFET (metal-oxide-semiconductor field-effect transistor), or a low drop-out (LDO) constant current regulator, or a switched-mode power supply may be used to regulate current.

A controller 400 such as a microcontroller or a system on a chip receives input from various sources, executes programmed logic, and actuates the driver 405 according to the programmed logic. Program memory in the form of ferroelectric RAM, NOR flash or OTP ROM may be included on chip, as well as RAM. Typical input and output devices include switches, relays, solenoids, LED's, small or custom liquid-crystal displays, radio frequency devices, and sensors for data such as temperature, humidity, light level etc. By way of example and not limitation, input devices may include sensors (e.g., sens1 435 and sens2 440), and switches (e.g., sw1 440 and sw2 445), and equipment output (e.g., eqpt out 450). The controller may contain an analog-to-digital converter (ADC) to read sensors that produce analog signals from sensors. The controller 400 may also include any of various timers, such as a programmable interval timer (PIT). The controller 400 may include a pulse-width modulation (PWM) block, to provide power control without consuming substantial programming and processing resources.

The controller 400 provides real-time response to events. When events occur, an interrupt system signals the controller 400 to suspend processing any current instruction sequence and to begin an interrupt service routine (ISR, or "interrupt handler") that will perform processing required based on the source of the interrupt, before returning to the original instruction sequence. Interrupt sources may include a logic level change on an input such as from a button being pressed or a switch being actuated, data received on a communication link or a signal received from a sensor.

The controller 400 may contain several general-purpose input/output pins (GPIO). GPIO pins are software configurable to either an input or an output state. When GPIO pins are configured to an input state, they may be used to read sensors or external signals. Configured to the output state, GPIO pins can drive external devices such as LEDs, indirectly, through external power electronics.

Sensors (e.g., sens1 435, sens2 440 ... sens$_n$) may include motion, sound and light sensors. While two sensors are shown, the invention is not limited to any particular number of sensors. Motion sensors (e.g., passive infrared motion sensor) may detect motion of an occupant in a room or a person approaching a door. Sound sensors (e.g., a microphone) may detect sound within or outside of a room. Light sensors (an LED reverse-biased to act as photodiodes, a photoresistor that changes resistance according to light intensity, a photodiode that can operate in photovoltaic mode or photoconductive mode, and a phototransistor, which acts like amplified photodiodes) may detect ambient lighting conditions. Such sensors may be used to activate a door frame light if motion is detected inside or outside a room, if motion is detected inside or outside a room and the light sensor indicates that the area is dark, if a sound is detected within or outside of a room, if a sound is detected within or outside of a room and the light sensor indicates that the area is dark. The detected sound may be any sound, or a particular sound (e.g., a sound of a particular frequency or range of frequencies, and a particular amplitude or range of amplitudes).

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

Switches (sw1 440 and sw2 445) may be provided to actuate the light sources. In one embodiment, a switch may be operably coupled between a power supply and a lighting element. In another embodiment, the switches may provide a logic level input to the controller 400 to start an interrupt service routine, which may be to illuminate the light source(s) 420-430. A switch may be positioned in a room and/or outside a room. Activating the switch may illuminate the light source.

Equipment 450 in the vicinity of a door frame according to principles of the invention may supply input data or an analog voltage level output to the controller 400. By way of example, an output from equipment that monitors a vital condition of a patient may be operably coupled to the controller 400 to signal an emergency event, such as a flatline on an electrocardiogram or an electroencephalogram, or dangerously low saturated oxygen read by pulse oximetry equipment. When such an event occurs, an interrupt system signals the controller 400 to suspend processing any current instruction sequence and to begin an interrupt service routine that will perform processing required based on the source of the interrupt, before returning to the original instruction sequence. Such processing may cause the door frame to illuminate, or to illuminate a particular color (e.g., red) and/or to flash as a signal to others. Such illumination may be in addition to other visible and audible alarms triggered by the equipment.

In the exemplary embodiment, AC main power is supplied 455 to an AC to DC converter (i.e., transformer with rectifier circuit) 415. The rectifier circuit may, by way of example, be half-wave (e.g., a single diode that passes half of the AC input voltage to the output), full-wave (e.g., two diodes coupled to a center tapped transformer and arranged to pass both the positive and the negative side of the AC input voltage to the output), and bridge (e.g., four diodes arranged in a diamond pattern so that, on each half phase of the AC sine wave, two of the diodes pass the current to the positive and negative sides of the output, and the other two diodes block current, producing a pulsed DC output). Additional filtering may be applied to flatten the pulsating DC that comes from the rectifier circuit to eliminate ripple.

If the voltage from the transformer exceeds or falls short of voltage level requirements of a component, or to regulate the output voltage, a DC to DC power converter 410 may be used. By way of example and not limitation, the converter may be a buck, boost-buck or buck-boost converter.

In sum, a door frame assembly according to principles of the invention may be attached to a wall around a doorway in the wall. The doorway is defined by a first side, a second side, and a top. The first side of the doorway extends from a floor to the top of the doorway. The second side of the doorway is parallel to the first side of the doorway and extends from the floor to the top of the doorway. The top of the doorway is perpendicular to the first side and second side of the doorway and extends from the first side of the doorway to the second side of the doorway.

A first side frame 130, a second side frame 150, and a top frame 110 are attached to the wall at a periphery of the doorway. The first side frame 130 is adjacent to the first side of the doorway. The second side frame 150 is adjacent to the second side of the doorway. The top frame 110 is adjacent to the top of the doorway. The second side frame 150 is parallel to the first side frame 130 and extends from the floor to the top of the doorway. The top frame 110 is perpendicular to the first side frame 130 and the second side frame 150 and extends from the first side frame 130 to the second side frame 150. Each of a first side frame assembly 125, second side frame assembly 145, and top frame assembly 105 comprise a frame structure (110, 130, 150) and a lighting element 115, 135, 155.

The frame structure (e.g., 150 in FIG. 6) is an extruded integrally formed object with a first free end (e.g., bottom) and a second free end (e.g., top), first lateral wall 207, a second lateral wall 220, a medial wall 209, a back wall 208, a connecting wall 211, a cylindrical protrusion 210, and a spring socket 215. The second lateral wall 220 is opposite the first lateral wall 207. The medial wall 209 is disposed between the first lateral wall 207 and the second lateral wall 220. The first lateral wall 207 has a back end. The medial wall 209 has a back end. The back wall 208 extends from and connects the back end of the first lateral wall 207 to the back end of the medial wall 209. The back wall 208, first lateral wall 207 and medial wall 209 define a first compartment 205. The connecting wall 211 extends from and connects the second lateral wall 220 to the medial wall 209. The cylindrical protrusion 210 extends from the second lateral wall 220 (at an angle) away from the medial wall 209. The spring socket 215 extends from the second lateral wall 220 opposite the cylindrical protrusion 210 towards the medial wall 209.

The lighting element 300 is contained in the first compartment 205 and extends from the first free end of the frame to the second free end of the frame in the first compartment 205. The lighting element 300 includes a light emitting surface 305 that extends from the first free end of the frame structure 150 to the second free end of the frame structure 150. The light emitting surface 305 is opposite the back wall 208.

The first lateral wall 207 of the frame structure 150 also includes a front end opposite the back end. A flange 206 extends from the front end of the first lateral wall 207 towards the medial wall 209. The flange 206 is perpendicular to the first and second lateral walls 207, 220 and the medial wall 209.

The lighting element 300 is a solid light transmitting material (e.g., acrylic). A light source 310 is attached to the lighting element 300 and configured to emit light into the lighting element 300. The lighting element 300 transmits the emitted light through the light emitting surface 305.

The light source 310 is at least one lamp, such as a light emitting diode or a plurality of light emitting diodes. The light emitting surface 305 may include an extractor pattern configured to emit light uniformly along the light emitting surface 305.

The light source 310 (or 420-430 in FIG. 9) may be operably coupled to a driver 405. The driver 405 supplies current to activate the light source 420-430. The driver 405 may be operably coupled to a controller 400. The controller 400 manages activation of the driver 405. One or more sensors 440, 445 may be operably coupled to the controller 400. A sensor 440, 445 generates an output signal upon detecting a stimulus (e.g., sound, motion, etc. . . . ). The controller 400 activates the driver 405 upon detection of the stimulus by the sensor 440, 445.

An extruded integrally formed molding 160 includes a leading edge 161, an opposite trailing edge 163, and a concave panel extending from the leading edge 161 to the trailing edge 163. The concave panel defines a compartment. A first socket 162 is formed in the compartment at the leading edge 161. A second socket 164 is formed in the compartment at the trailing edge 163. The first socket 162 is sized and shaped to mate with the cylindrical protrusion 210 of the frame structure. A spring 159 extends from the V-shaped socket 164 of the molding to the spring socket 215 of the frame structure to hold the molding 160 on the frame.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A door frame assembly comprising:
a frame, the frame being an extruded integrally formed structure with a bottom end and a top end, a first lateral wall, a second lateral wall, a medial wall, a back wall, a connecting wall, a cylindrical protrusion, and a spring socket, the second lateral wall being opposite the first lateral wall and the medial wall being disposed between the first lateral wall and the second lateral wall, the first lateral wall having a back end, the medial wall having a back end, the back wall extending from and connecting the back end of the first lateral wall to the back end of the medial wall, the back wall, first lateral wall and the medial wall defining a first compartment, the connecting wall extending from and connecting the second lateral wall to the medial wall, the cylindrical protrusion extending from the second lateral wall away from the medial wall, and the spring socket extending from the second lateral wall opposite the cylindrical protrusion towards the medial wall; and
a lighting element, the lighting element being contained in the first compartment and extending from the bottom end of the frame to the top end of the frame in the first compartment, and the lighting element including a light emitting surface, the light emitting surface extending from the bottom end of the frame to the top end of the frame and being opposite the back wall.

2. The door frame assembly according to claim 1, the first lateral wall including a front end opposite the back end of the first lateral wall, and the frame further comprising a flange extending from the front end of the first lateral wall towards the medial wall, the flange being perpendicular to the first lateral wall.

3. The door frame assembly according to claim 1, the lighting element comprising a solid light transmitting material, and the door frame assembly further comprising a light source, the light source being attached to the lighting element and configured to emit light into the lighting element, and the lighting element transmitting the emitted light through the light emitting surface.

4. The door frame assembly according to claim 3, the light source comprising a light emitting diode.

5. The door frame assembly according to claim 3, the light source comprising a plurality light emitting diodes.

6. The door frame assembly according to claim 3, the light emitting surface including an extractor pattern configured to emit light uniformly along the light emitting surface.

7. The door frame assembly according to claim 3, the light source being operably coupled to a driver, the driver supplying current to activate the light source, the driver being operably coupled to a controller, the controller controlling activation of the driver.

8. The door frame assembly according to claim 7, a sensor operably coupled to the controller, the sensor generating an output signal upon detecting a stimulus, and the controller activating the driver upon detection of the stimulus by the sensor.

9. The door frame assembly according to claim 3, further comprising a molding, the molding being an extruded integrally formed structure, the molding including a leading edge, an opposite trailing edge, and a concave panel extending from the leading edge to the trailing edge, the concave panel defining a molding compartment, a first socket formed in the molding compartment at the leading edge, and a second socket formed in the molding compartment between the trailing edge and first socket, and the first socket being sized and shaped to mate with the cylindrical protrusion of the frame.

10. The door frame assembly according to claim 9, further comprising a spring, the spring extending from the second socket of the molding to the spring socket of the frame.

11. A door frame assembly comprising:
   a wall,
   a doorway in the wall, the doorway having a first side, a second side, and a top, the first side of the doorway extending from a floor to the top of the doorway, the second side of the doorway being parallel to the first side of the doorway and extending from the floor to the top of the doorway, and the top of the doorway being perpendicular to the first side and second side of the doorway and extending from the first side of the doorway to the second side of the doorway,
   a first side frame, a second side frame, and a top frame each attached to the wall at a periphery of the doorway, the first side frame being adjacent to the first side of the doorway, the second side frame being adjacent to the second side of the doorway, and the top frame being adjacent to the top of the doorway, and the second side frame being parallel to the first side frame and extending from the floor to the top of the doorway, and the top frame being perpendicular to the first side frame and the second side frame and extending from the first side frame to the second side frame, and each of the first side frame, second side frame, and top frame comprising a frame structure and a lighting element;
      the frame structure being an extruded integrally formed object with a first free end and a second free end, first lateral wall, a second lateral wall, a medial wall, a back wall, a connecting wall, a cylindrical protrusion, and a spring socket, the second lateral wall being opposite the first lateral wall and the medial wall being disposed between the first lateral wall and the second lateral wall, the first lateral wall having a back end, the medial wall having a back end, the back wall extending from and connecting the back end of the first lateral wall to the back end of the medial wall, and the back wall, first lateral wall and the medial wall defining a first compartment, and the connecting wall extending from and connecting the second lateral wall to the medial wall, the cylindrical protrusion extending from the second lateral wall away from the medial wall, and the spring socket extending from the second lateral wall opposite the cylindrical protrusion towards the medial wall; and
      the lighting element being contained in the first compartment and extending from the first free end of the frame to the second free end of the frame in the first compartment, and the lighting element including a light emitting surface, the light emitting surface extending from the first free end of the frame structure to the second free end of the frame structure and being opposite the back wall.

12. The door frame assembly according to claim 11, the first lateral wall of the frame structure including a front end opposite the back end of the first lateral wall, and the frame structure further comprising a flange extending from the front end of the first lateral wall towards the medial wall, the flange being perpendicular to the first lateral wall.

13. The door frame assembly according to claim 11, the lighting element comprising a solid light transmitting material, and the door frame assembly further comprising a light source, the light source being attached to the lighting element and configured to emit light into the lighting element, and the lighting element transmitting the emitted light through the light emitting surface.

14. The door frame assembly according to claim 13, the light source comprising a light emitting diode.

15. The door frame assembly according to claim 13, the light source comprising a plurality light emitting diodes.

16. The door frame assembly according to claim 13, the light emitting surface including an extractor pattern configured to emit light uniformly along the light emitting surface.

17. The door frame assembly according to claim 13, the light source being operably coupled to a driver, the driver supplying current to activate the light source, the driver being operably coupled to a controller, the controller controlling activation of the driver.

18. The door frame assembly according to claim 17, a sensor operably coupled to the controller, the sensor generating an output signal upon detecting a stimulus, and the controller activating the driver upon detection of the stimulus by the sensor.

19. The door frame assembly according to claim 13, further comprising a molding, the molding being an extruded integrally formed structure, the molding including a leading edge, an opposite trailing edge, and a concave panel extending from the leading edge to the trailing edge, the concave panel defining a molding compartment, a first socket formed in the molding compartment at the leading edge, and a second socket formed in the molding compartment between the trailing edge and first socket, and the first socket being sized and shaped to mate with the cylindrical protrusion of the frame structure.

20. The door frame assembly according to claim 19, further comprising a spring, the spring extending from the second socket of the molding to the spring socket of the frame structure.

* * * * *